US009130763B2

(12) United States Patent
Nukala et al.

(10) Patent No.: US 9,130,763 B2
(45) Date of Patent: Sep. 8, 2015

(54) AUTOMATIC SHARING OF EVENT CONTENT BY LINKING DEVICES

(75) Inventors: Chandrasekhar Nukala, Redmond, WA (US); David M. Callaghan, Kirkland, WA (US); Paul Frederick Bawel, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 506 days.

(21) Appl. No.: 13/163,758

(22) Filed: Jun. 20, 2011

(65) Prior Publication Data

US 2012/0324589 A1 Dec. 20, 2012

(51) Int. Cl.
*H04L 12/18* (2006.01)
*H04L 29/08* (2006.01)
*G06Q 10/10* (2012.01)

(52) U.S. Cl.
CPC ........ *H04L 12/1818* (2013.01); *H04L 67/1097* (2013.01); *H04L 67/26* (2013.01); *G06Q 10/109* (2013.01); *H04L 12/18* (2013.01); *H04L 12/1813* (2013.01); *H04L 12/1822* (2013.01); *H04L 12/1827* (2013.01)

(58) Field of Classification Search
CPC .. G06Q 10/109; H04L 12/1822; H04L 12/18; H04L 12/1813; H04L 12/1827; H04L 12/1818; H04L 67/26
USPC ............................................. 709/204; 726/28
See application file for complete search history.

(56) References Cited

U.S. PATENT DOCUMENTS

| 7,853,483 | B2 | 12/2010 | Patten et al. | |
|---|---|---|---|---|
| 7,865,206 | B2 | 1/2011 | Quoc et al. | |
| 7,895,445 | B1 | 2/2011 | Albanese et al. | |
| 2003/0132284 | A1* | 7/2003 | Reynolds et al. | 235/380 |
| 2004/0221043 | A1* | 11/2004 | Su et al. | 709/227 |
| 2006/0002556 | A1* | 1/2006 | Paul | 380/270 |
| 2007/0239867 | A1 | 10/2007 | Belimpasakis et al. | |
| 2008/0239994 | A1 | 10/2008 | Xiong et al. | |
| 2009/0061835 | A1 | 3/2009 | Schmidt et al. | |
| 2009/0111378 | A1 | 4/2009 | Sheynman et al. | |

(Continued)

FOREIGN PATENT DOCUMENTS

KR 1020060053956 A 5/2006

OTHER PUBLICATIONS

"Social Networking Application", Retrieved at << http://www.nokia-asia.com/about-nokia/privacy/services/social-networking-application , Retrieved Date: Mar. 4, 2011, p. 1.

(Continued)

*Primary Examiner* — Jung Kim
*Assistant Examiner* — Ayoub Alata
(74) *Attorney, Agent, or Firm* — Nicholas Chen; Kate Drakos; Micky Minhas

(57) ABSTRACT

Embodiments enable content sharing using event notifications that include a global identifier and a private identifier. The event notifications are sent to potential participants to an event. Potential participants that accept the event notification or otherwise request to join the event use the private identifier to submit content to a content sharing service. Based at least on the private identifiers associated with event participants, the content from event participants is selectively shared among the other event participants.

20 Claims, 6 Drawing Sheets

(56) References Cited

U.S. PATENT DOCUMENTS

| | | |
|---|---|---|
| 2009/0210491 A1 | 8/2009 | Thakkar et al. |
| 2009/0219815 A1* | 9/2009 | Insler et al. ............ 370/235 |
| 2010/0035691 A1* | 2/2010 | Wild et al. ............. 463/42 |
| 2010/0114968 A1* | 5/2010 | Dean ..................... 707/796 |
| 2010/0293105 A1 | 11/2010 | Blinn et al. |
| 2011/0029610 A1 | 2/2011 | Chao et al. |

OTHER PUBLICATIONS

"International Search Report", Mailed Date: Feb. 1, 2013, Application No. PCT/US2012/043008, Filed Date: Jun. 18, 2012, pp. 1-11.

"International Preliminary Report on Patentability Issued in PCT Patent Application No. PCT/US2012/043008", Mailed Date: Dec. 23, 2013, 8 Pages.

* cited by examiner

AUTOMATIC SHARING OF EVENT CONTENT BY LINKING DEVICES

BACKGROUND

Attendees to conferences or other events often receive conference materials from an event organizer manually by postal mail or electronic mail before or after the conference. The attendees may also separately exchange information with selected other attendees by manually communicating with each other outside of the conference. As an example, when attendees pose for an informal group picture, snapshots have to be taken with multiple cameras so that more than one person can have a group photograph. The attendees with the cameras may or may not subsequently share the group photograph with other attendees. For example, those attendees may not know the names or contact information of each attendee in the photograph to enable sharing of the photograph.

Additionally, with the existing systems, change information relating to the conference (e.g., room change, time change) has to be manually communicated by the event organizer to each of the attendees. The existing systems generally lack an automated way for sharing content among the attendees.

SUMMARY

Embodiments of the disclosure enable content sharing using event notifications. A computing device identifies potential participants to an event. The computing device notifies the identified potential participants of the event. Notifying includes sending a global identifier and one of a plurality of private identifiers to each of the identified potential participants. Each of the plurality of private identifiers is generally associated with one or more of the identified potential participants. A participant can be a group that may include subgroups with a private identifier that is common to the group or subgroup. A request is received from one or more of the identified potential participants to join the event as event participants. The received request includes the global identifier. The event participants are associated with the event based on the global identifier. Content (e.g., event content) is received from at least one of the event participants for association with the event. The computing device selectively shares the received content with one or more of the event participants based at least on the private identifiers associated with the event participants. Public and private identifiers may take many forms, including but not limited to generated codes, assignable phone numbers, addresses, icons, and the like.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
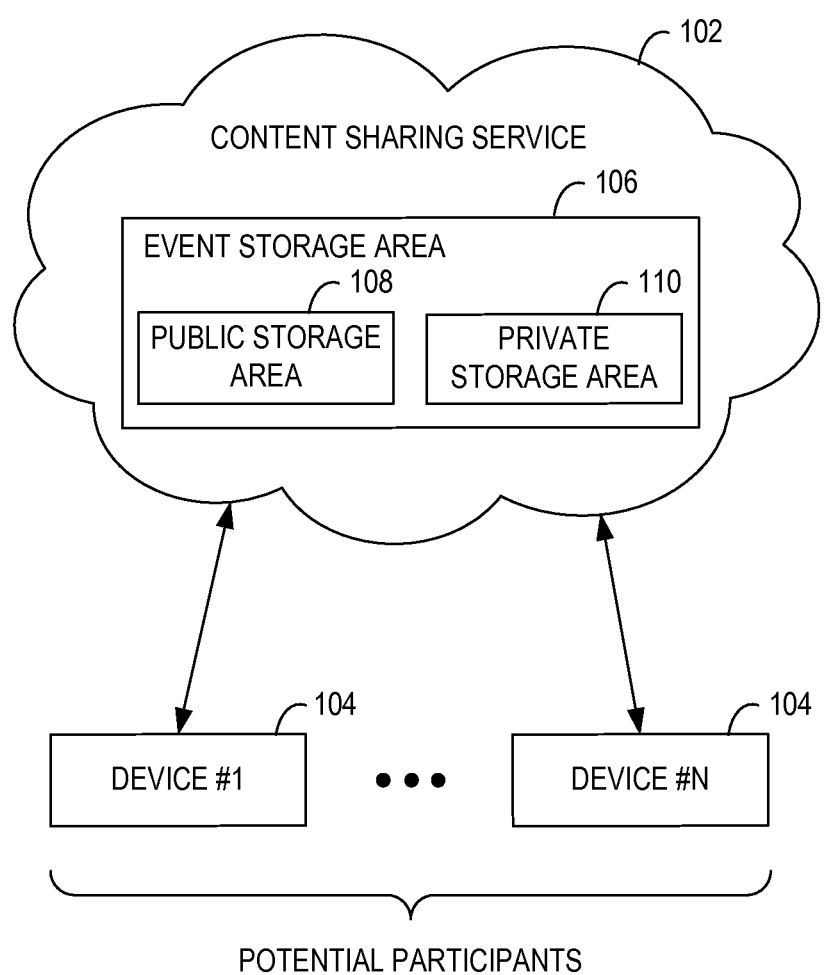
FIG. 1 is an exemplary block diagram illustrating a content sharing service communicating with a plurality of devices as potential participants to an event.

Referring to the figures, embodiments of the disclosure enable event participants to share content. In some embodiments, event participants receive notifications each including a global identifier 516 corresponding to an event and a private identifier 518 corresponding to each of the event participants. The event participants use the global identifier 516 and the private identifier 518 to submit content to a content sharing service 102 that automatically shares the submitted content with other event participants. Aspects of the disclosure enable devices 104 to share content among paired or linked devices 104. For example, photographs captured on one device 104 become available on the other paired devices 104 automatically.

Aspects of the disclosure are operable with any form and type of event. Representative events include concerts, conferences, sporting events, and any other in-person or virtual gatherings. The events may be public or private, and include any quantity of participants who may be physically attending the event or remotely accessing the event through the typical means such as telecommunications, video conferencing, telepresence, etc. For example, the events may also include a presentation to a small group of people in a workplace environment. In some embodiments, the content sharing service 102, mobile computing device 502, and/or other devices 104 act as the event organizer.

Aspects of the disclosure are operable with any form and type of content and information. Content to be shared includes any content associated with the event. Exemplary content includes images (e.g., photographs), documents, files, notes, audio clips, video, contact information (e.g., names, telephone numbers, email addresses), metadata and the like.

Referring again to FIG. 1 and FIG. 2, an exemplary block diagram illustrates the content sharing service 102 communicating with a plurality of devices 104 as potential participants to an event. The content sharing service 102, or other hosted service, may be implemented by a computing device 202, or a group of computing devices or processing units such as in a cloud computing configuration (e.g., as a cloud service). In some embodiments, one or more devices at the event participate as both an attendee 104 and host, or assist with hosting, the content sharing service 102. In the cloud computing configuration, each of the computing devices represents any device executing instructions (e.g., as application programs, operating system functionality, or both) to implement the operations and functionality associated with the content sharing service 102.

The content sharing service 102 has access to an event storage area 106 or other memory storage area. The event storage area 106 stores content to be shared with the devices 104 that are participants to the event. The content stored in the event storage area 106 is mirrored, in whole or in part, to the devices 104 that are participants to the event. In another embodiment of the disclosure, a first one of the devices 104 provides a second one of the devices 104 with access to local storage of the first device if, for example, the second device does not have sufficient available storage for all the content shared by all the devices 104 at that moment in time. If the first device were to delete content, the deleted content is first mirrored to the event store 106 so that the second device can access the content at a future date/time.

For each event, the event storage area 106 includes a public storage area 108 and a private storage area 110. Content from the participants is stored in either the public storage area 108 or the private storage area 110, as described herein. For each event, content stored in the public storage area 108 may be accessed by each of the event participants associated with the event. Content stored in the private storage area 110 may be accessed by a subset of the event participants associated with the event. For example, the private storage area 110 may be accessed by a working subgroup of the event participants. Alternatively, storage area 106 may be an area where content is tagged or otherwise identified as either public or private with metadata, header file field(s) and the like (not shown), rather than separate storage areas 108 and 110.

The devices 104, such as device #1 through device #N represent any computing devices associated with one or more users (e.g., user 504). For example, the devices 104 may include mobile computing devices (e.g., mobile computing device 502) such as mobile telephones, laptops, netbooks, tablets, book readers, media players, and the like. The devices 104 may also represent kiosks or other stationary devices. Each of the devices 104 is a potential participant in events as shown in FIG. 1. Further, the user may have one or more devices 104 as a participant to the same event. For example, the user may have a mobile telephone as one device 104 and a laptop as another device 104 with both devices 104 being connected to the same event.

Figure 2:
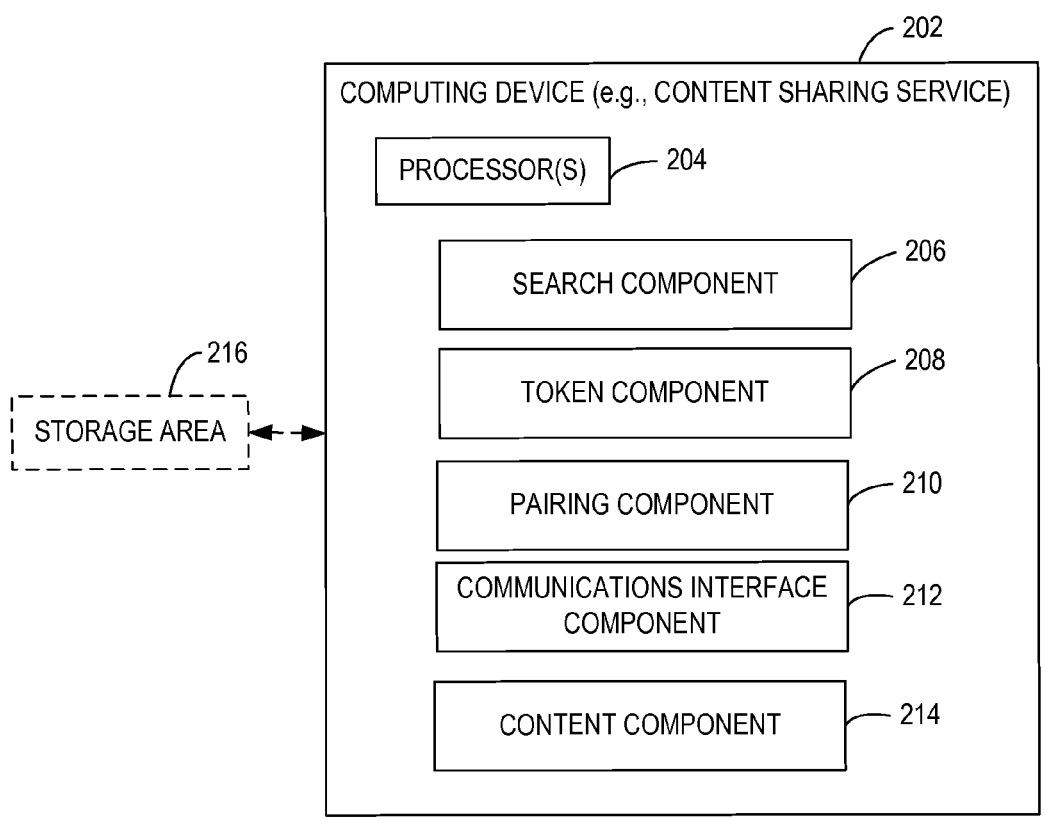
FIG. 2 is an exemplary block diagram illustrating a computing device operating as the content sharing service.

Referring next to FIG. 2, an exemplary block diagram illustrates the computing device 202 operating as the content sharing service 102. The computing device 202 includes one or more processors 204 that execute one or more computer-executable components. The computer-executable components are stored in a memory area accessible by the computing device 202. The exemplary components illustrated in FIG. 2 include a search component 206, a token component 208, a pairing component 210, a communications interface component 212, and a content component 214.

The search component 206, when executed by the processor 204, causes the processor 204 to identify potential participants to an event and to identify an event organizer associated with the event. The search component 206 may also run a query or retrieve information from a database collection of registered attendees, a database collection of potential contacts, and/or directory of usernames and email addresses.

The token component 208, when executed by the processor 204, causes the processor 204 to notify the potential participants identified by the search component 206 of the event. In some embodiments, the notification occurs by sending the global identifier 516 and one of a plurality of private identifiers 518 to each of the identified potential participants. Each of the plurality of private identifiers 518 is associated with at least one of the identified potential participants. A participant can also be a group that may include subgroups with a private identifier 518 that is common to the group or subgroup. In some embodiments, the token component 208 sends the global identifier 516 and the private identifier 518 as a calendar invitation to the potential participants of the event.

While the global identifier 516 is associated with the event, each private identifier 518 is unique among the participants to the event. For example, the private identifier 518 may include a globally unique identifier (GUID), login credentials (e.g., username and password), or other data identifying the participant. The private identifier 518 may also include a key or other data string for use by the event participant to encrypt content or digitally sign the content submitted to the content sharing service 102. The key or other data string may be used by the content sharing service 102 to authenticate the event participant and/or the submitted content. In general, the global identifier 516 (e.g., a public identifier) and the private identifiers 518 may take many forms, including but not limited to generated codes, assignable phone numbers, addresses, icons, and the like.

The pairing component 210, when executed by the processor 204, causes the processor 204 to receive a request from one or more of the identified potential participants to join the event as event participants. The received request includes the global identifier 516. The pairing component 210 further associates the event participants with the event based on the global identifier 516.

The communications interface component 212, when executed by the processor 204, causes the processor 204 to receive content from at least one of the event participants for association with the event. The communications interface component 212 receives the content during any time period including before, during, and/or after occurrence of the event. In some embodiments, the communications interface component 212 includes a network interface card and/or computer-executable instructions (e.g., a driver) for operating the network interface card.

The content component 214, when executed by the processor 204, causes the processor 204 to combine the received content with content from the event organizer. In some embodiments, the content component 214 may merge notes, slides, and/or images with "official" content provided by the event organizer. For example, the content component 214 may compare timestamps associated with slides presented by a speaker with timestamps associated with notes taken by event participants viewing the slides to chronologically insert the notes into the slides. The combined content is then selectively shared with one or more of the event participants based at least on the private identifiers 518 associated with the event participants. Content may also be combined based on private identifiers 518 so that certain participant content is only available for limited distribution to those participants having permission to access that specific content and/or information.

In some embodiments, the content sharing service 102 stores at least a portion of the content received by the communications interface component 212 in a storage area 216. The storage area 216 is accessible by the content sharing service 102, but may be remote from the content sharing service 102. The storage area 216 may also be shared memory on one or more of the devices 104, or mirrored from the devices 104.

Figure 3A:
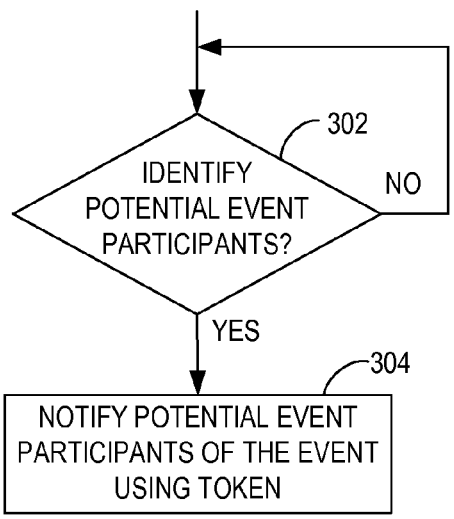
FIG. 3A is an exemplary flow chart illustrating operation of the content sharing service to identify potential participants.
Figure 3B:
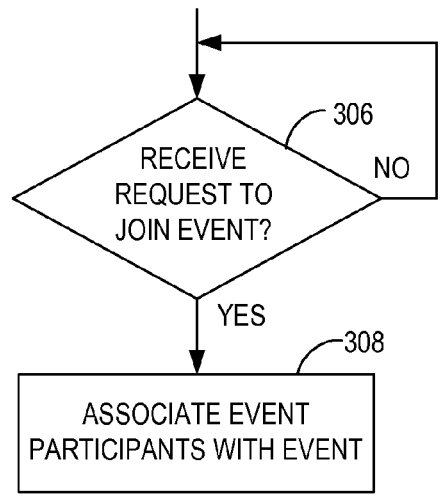
FIG. 3B is an exemplary flow chart illustrating operation of the content sharing service to join participants to the event.
Figure 3C:
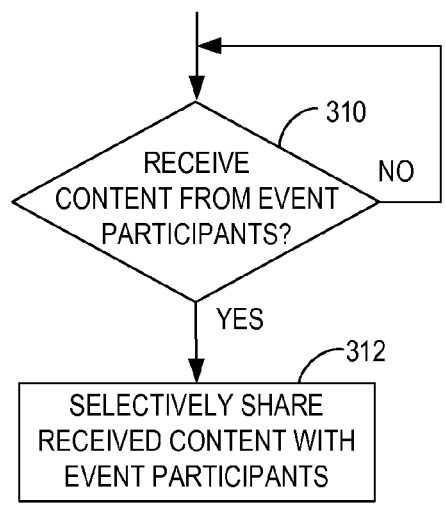
FIG. 3C is an exemplary flow chart illustrating operation of the content sharing service to receive content from an event participant and selectively share the received content with other participants.

Referring next to FIG. 3A, FIG. 3B, and FIG. 3C, exemplary flow charts illustrate operation of the content sharing service 102. The operations illustrated in FIG. 3A, FIG. 3B, and FIG. 3C may be performed in sequence as shown, or may be performed in parallel (e.g., by separate continuously executing threads).

In FIG. 3A, an exemplary flow chart illustrates operation of the content sharing service 102 to identify potential participants. The content sharing service 102 may identify the potential participants in several ways. For example, the potential participants may be identified based on participant preferences, participant locations, and/or selection by an event organizer.

If the content sharing service 102 identifies one or more potential participants to an event at 302, the content sharing service 102 notifies the identified potential participants of the event at 304. For each potential participant, the notification includes the global identifier 516 and one of a plurality of private identifiers 518 that corresponds to the potential participant. In some embodiments, the notification is a token 514 that includes the global identifier 516, the private identifier 518, a description of the event, identification of the event organizer, and the like.

In some embodiments, the potential participants are not proximate, or located near, to each other, to the content sharing service 102, or to the event. For example, the potential participants may be reachable electronically via an electronic mail message, calendar invitation, social network or other device or virtual connection.

After notifying the identified potential participants at 304, the content sharing service 102 may continue to search for additional potential participants (e.g., as in 302), as well as proceed to perform the operations described next with reference to FIG. 3B.

In FIG. 3B, an exemplary flow chart illustrates operation of the content sharing service 102 to join participants to the event. If the content sharing service 102 receives a request to join the event from one of the notified potential participants at 306, the content sharing service 102 links, joins, connects, or otherwise associates the requesting participant (e.g., the event participant) with the event at 308. The request to join the event includes the global identifier 516 of the event as well as the private identifier 518 of the requesting potential participant. The global identifier 516 is used to identify which event the requesting potential participant is trying to join.

In some embodiments, a user may forward a received request to join an event to a co-worker or other suggested participant who then responds to the content sharing service 102 using the original global identifier 516 and the original private identifier 518. In this example, the content sharing service 102 may allow multiple users to share the same global identifier 516 and the same private identifier 518. Alternatively, when the user forwards the original request to join the event to the co-worker, the user notifies the content sharing service 102, the event organizer, or another entity that originated the request to issue a new private identifier 518 and/or global identifier 516 for the co-worker. In another implementation, the user generates a new private identifier 518 and/or global identifier 516 for use by the co-worker and notifies the content sharing service 102 and the co-worker of the new private identifier 518 and/or global identifier 516. In still another implementation, the user recommends to the content sharing service 102 that the content sharing service 102 send a separate request to the co-worker with a new private identifier 518 and/or global identifier 516.

After associating the event participants with the event at 308, the content sharing service 102 continues to monitor requests to join events (e.g., as in 306), continues to search for additional potential participants (e.g., as in 302), and proceeds to perform the operations described next with reference to FIG. 3C.

In FIG. 3C, an exemplary flow chart illustrates operation of the content sharing service 102 to receive content from an event participant and selectively share the received content with other participants. If the content sharing service 102 receives content from one or more of the event participants at 310, the content sharing service 102 selectively shares the received content with other event participants at 312. The received content includes the global identifier 516 and the private identifier 518 of the event participant submitting the content. The content sharing service 102 associates the received content with the event corresponding to the global identifier 516.

Sharing the content is performed based on the private identifier 518. For example, the private identifier 518 of the event participant who submitted the content may indicate that the content is to be shared with each of the other event participants. In such instances, the content sharing service 102 may store the received content in the public storage area 108.

In another example, the private identifier 518 of the event participant who submitted the content may indicate that the content is to be shared only with a subset of the other event participants (e.g., only particular identified event participants, or event participants having particular characteristics associated therewith). In such instances, the content sharing service 102 may store the received content in the private storage area 110.

The content sharing service 102 may also implement filtering on the received content to only share the content with event participants meeting particular criteria such as age, rating, employer or other organization affiliation, preferences of the event participants, and preferences of the event organizer Filtering the content may also include prioritizing or ranking the content based on feedback from the event participants (e.g., crowd-sourced selections or voting), prioritization criteria provided by the event organizer (e.g., various levels of event participants), and/or the status, role, or position of each event participant. For example, content provided by a speaker at the event takes priority over content provided by an attendee. Prioritizing the submitted content enables the content sharing service 102 to ensure that at least high priority content is shared when data congestion, memory capacity, bandwidth constraints, or other limitations prevent sharing of all submitted content.

In some embodiments, permissions are defined for each of the event participants and associated with the private identifiers 518 of the event participants. The permissions control access by the event participants to the submitted content. The permissions may be defined by the event participants themselves, the event organizer, or another entity. For example, the event participants may declare sharing preferences identifying with whom they want to share content. The event participants may also declare preferences identifying from whom they are willing to receive content. In this manner, the event participants are able to reject or refuse content from particular participants. In some embodiments, the content sharing service 102 applies digital rights management (DRM) to the content uploaded by the event participants before the content is distributed to other event participants. The DRM policy can include requirements such as a content license for viewing the material, which is also provided to the event participants during the content distribution.

The content may be received by the content sharing service 102 as soon as the content is created by the event participant who submits the content. In other embodiments, the content may be received at regular intervals, such as a nightly batch. Similarly, the content sharing service 102 may share the content instantaneously, immediately, or otherwise as soon as the content is received, or may share the content at regular intervals, such as a nightly batch update. The content sharing service 102 may also keep track of which participant has accessed which content and provide notifications when new content is available. Also, the content sharing service 102 may store content for some time during and after an event for participants that have not accessed available content or otherwise need to access the content again. After some period of time, content may be moved to another accessible location and the content sharing service 102 provides a pointer, a web address or other information for a participant to access the content.

In some embodiments, the content sharing service 102 indexes and provides rich search capabilities of the content aggregated from the event participants by keyword or other relevant criteria. For example, event participants can find all content submitted by an event participant named "Robert Browning," or find all content that was posted at a specific day and time such as May 18, 2011 at 10:50 am.

Figure 4:
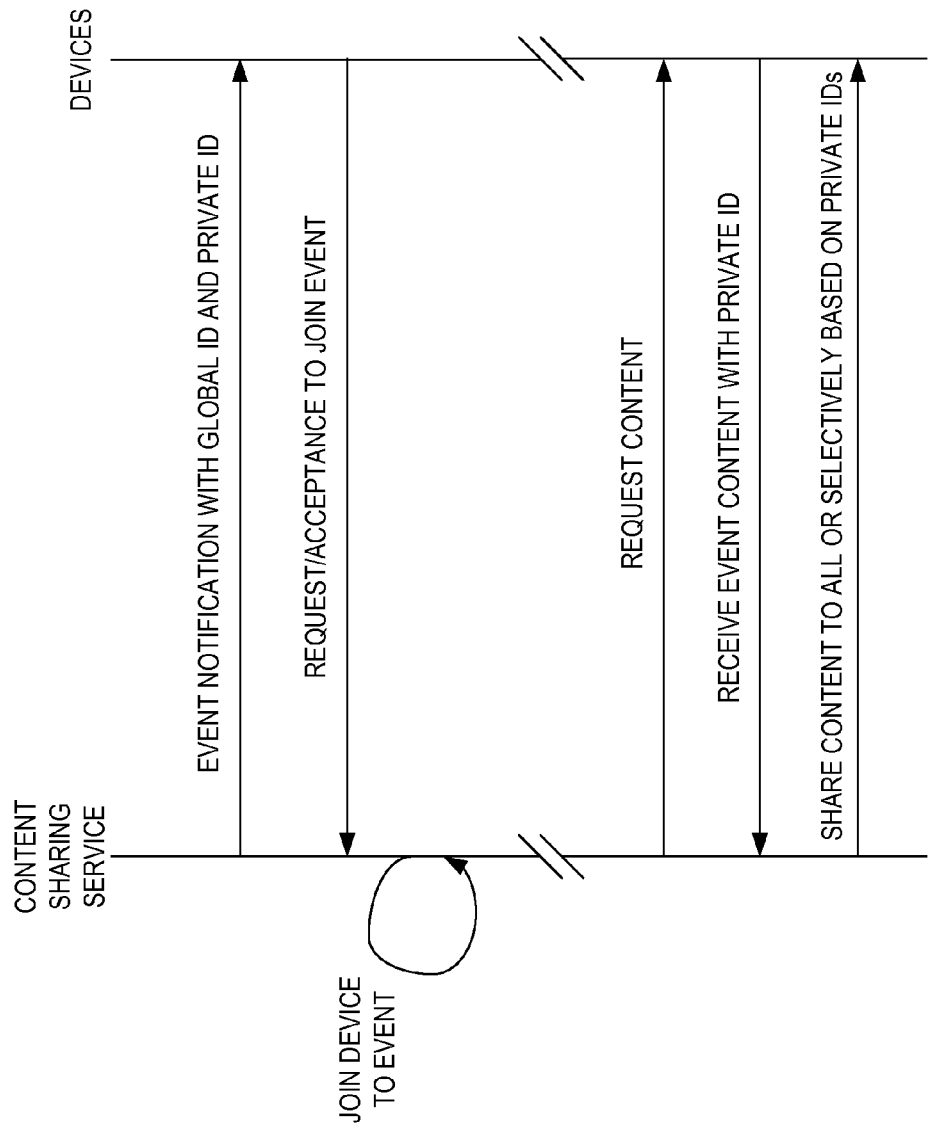
FIG. 4 is an exemplary sequence diagram illustrating communication between the content sharing service and one or more devices to sharing of event-related content among the devices.

Referring next to FIG. 4, an exemplary sequence diagram illustrates communication between the content sharing service 102 and one or more devices 104 to sharing of event-related content among the devices 104. After identifying the devices 104 to invite to the event, the content sharing service 102 sends an event notification that includes the global identifier 516 and the appropriate private identifier 518 to each of the devices 104 that are potential participants to the event. One or more of the devices 104 then accept the event notification, or otherwise request to join the event. The content sharing service 102 then joins the requesting devices 104 to the event to enable content sharing.

Subsequently, at least one of the devices 104 provides content, related to the event, to the content sharing service 102. Along with the content, the device 104 provides the private identifier 518 corresponding to the device 104. The content sharing service 102 selectively shares the received content with the other participant devices 104 based on the private identifiers 518 of the content-producing device 104 and of the other participant devices 104, as described herein. If content is designated for all participants, then content is shared to all participants rather than to a selected group. Alternatively, or additionally, the content sharing service 102 may request content from participant device 104 with a content request. Content is then received by the content sharing service 102, which then shares the received content with participants as just described.

Figure 5:
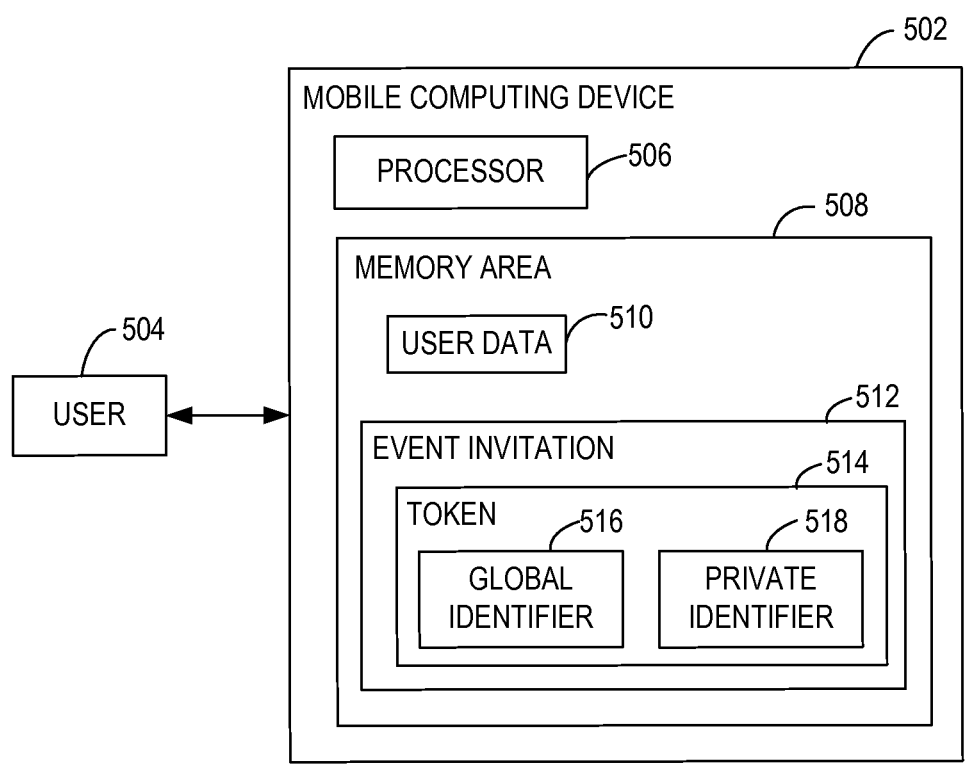
FIG. 5 is an exemplary block diagram illustrating a mobile computing device storing an event invitation including a global identifier and a private identifier.

Referring next to FIG. 5, an exemplary block diagram illustrates a mobile computing device 502 storing an event invitation 512 including the global identifier 516 and the private identifier 518. The mobile computing device 502 represents any of the devices 104. Further, the elements illustrated in FIG. 5 may operate in a context in which the content sharing service 102 is present or absent. In this example, the mobile computing device 502 of the user 504 facilitates detection of events, identification of potential participants, and content sharing. For example, aspects of the disclosure may include the mobile computing device 502 containing one or more event invitations 512 with shared or unique identifiers 516 and 518.

The mobile computing device 502 represents any device executing instructions (e.g., as application programs, operating system functionality, or both) to implement the operations and functionality associated with the mobile computing device 502. The mobile computing device 502 may include any portable device. In some embodiments, the mobile computing device 502 includes a mobile telephone, laptop, tablet, computing pad, netbook, gaming device, and/or portable media player. In other embodiments, however, the mobile computing device 502 may also include less portable devices such as desktop personal computers, kiosks, and tabletop devices. Additionally, the mobile computing device 502 may represent a group of processing units or other computing devices.

The mobile computing device 502 has at least one processor 506 and a memory area 508. The mobile computing device 502 may have other elements such as a camera and/or microphone with which to create content for sharing. The processor 506 includes any quantity of processing units, and is programmed to execute computer-executable instructions for implementing aspects of the disclosure. The instructions may be performed by the processor 506 or by multiple processors executing within the mobile computing device 502, or performed by a processor external to the mobile computing device 502. In some embodiments, the processor 506 is programmed to execute instructions such as those illustrated in the figures (e.g., FIG. 6A, FIG. 6B, and FIG. 6C).

The memory area 508 includes any quantity of computer-readable media associated with or accessible by the mobile computing device 502. The memory area 508 may be internal to the mobile computing device 502 (as shown in FIG. 5), external to the mobile computing device 502 (not shown), or both (not shown).

The memory area 508 further stores user data 510. The user data 510 describes affiliations, interests, and other characteristics of the user of the mobile computing device 502. The user data 510 may include, for example, social networking activity data of the user such as cached copies of recent microblog postings, cached versions of submissions to social networking websites, and the like. The memory area 508 also stores the event invitation 512. The event invitation 512 includes the token 514 that includes the global identifier 516 and one of the private identifiers 518. The event invitation 512 may also identify the types of content available for sharing. The content types may be different for each event. Exemplary content types include audio, video, images, virtual business cards, documents, related information, and links thereto. Other content types are within the scope of the disclosure.

The mobile computing device 502 generates the event invitation 512 for each of the potential participants, as next described with reference to FIG. 6A, FIG. 6B, and FIG. 6C.

Figure 6A:
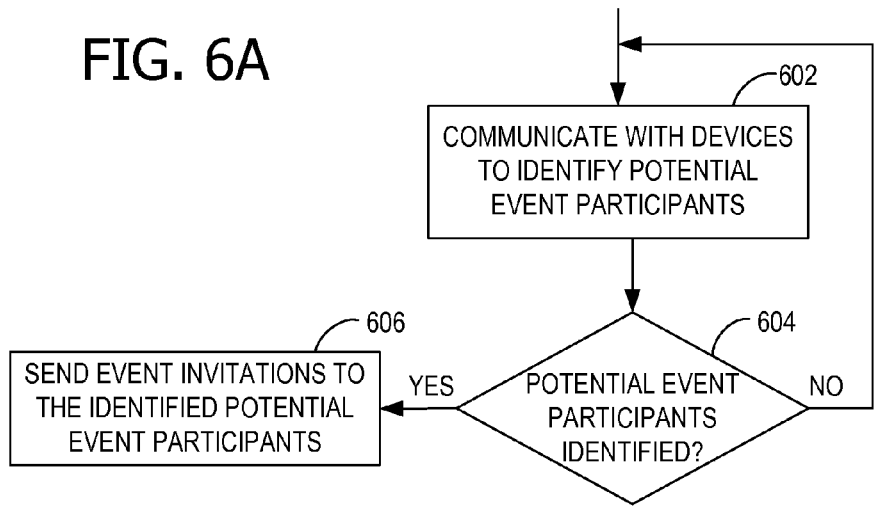
FIG. 6A is an exemplary flow chart illustrating operation of the mobile computing device to communicate with devices to identify potential participants.
Figure 6B:
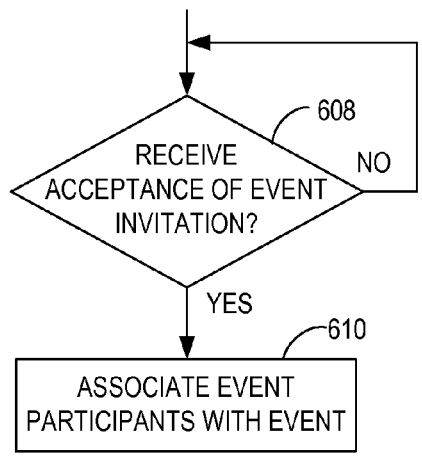
FIG. 6B is an exemplary flow chart illustrating operation of the mobile computing device to associate participants with the event.
Figure 6C:
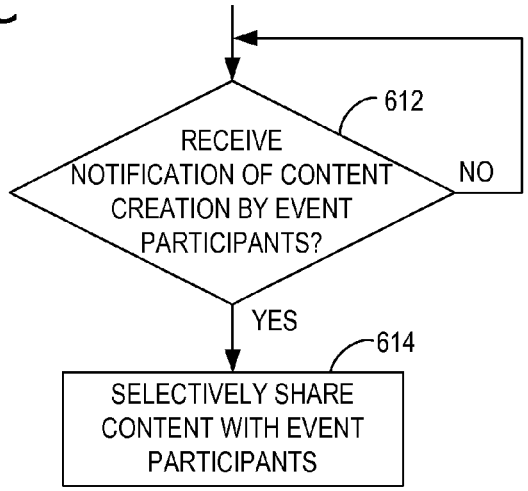
FIG. 6C is an exemplary flow chart illustrating operation of the mobile computing device to receive content created by event participants and selectively share the received content with other participants.

Referring next to FIG. 6A, FIG. 6B, and FIG. 6C, exemplary flow charts illustrate operation of the mobile computing device 502. The operations illustrated in FIG. 6A, FIG. 6B, and FIG. 6C may be performed in sequence as shown, or may be performed in parallel (e.g., by separate continuously executing threads). Further, the operations may be implemented as an application downloaded and installed on the mobile computing device 502. For example, the application may be downloaded from the content sharing service 102 or the event organizer.

In FIG. 6A, an exemplary flow chart illustrates operation of the mobile computing device 502 to communicate with devices 104 to identify potential participants. The mobile computing device 502 may identify the potential participants in several ways. For example, the potential participants may be identified based on participant preferences, participant locations, and/or selection by an event organizer.

At 602, the mobile computing device 502 communicates with one or more devices 104 to identify potential participants to the event based on the user data 510 stored in the memory area 508. For example, the mobile computing device 502 may detect proximate devices 104, and initiate communication with those detected devices 104. The proximate devices 104 may be detected via any technology including Wi-Fi, BLUETOOTH brand communication services, global positioning systems (GPS) and/or location-based services and the like. The device 502 may also access a remote registration or other database to identify potential participants.

Communicating with the detected devices 104 may include comparing user data stored on each detected device 104 with the user data 510 stored by the mobile computing device 502. For example, the mobile computing device 502 attempts to identify detected devices 104 whose users have a common interest with the user of the mobile computing device 502. Common interest may include a common professional affiliation, common topics of interest, shared membership in social groups, etc. The mobile computing device 502 may further detect or identify one or more of the events by communicating with the devices 104. For example, calendar data on one of the devices 104 may indicate an event to which the user of the mobile computing device 502 may have an interest in attending, based on the user data 510 stored by the mobile computing device 502.

If the mobile computing device 502 identifies potential participants at 604, the mobile computing device 502 notifies the identified potential participants by sending the event invitation 512 to each of the identified potential participants at 606. Each event invitation 512 includes the global identifier 516 and the private identifier 518 corresponding to each recipient potential participant. In some embodiments, the event notification includes the token 514 that includes the global identifier 516, the private identifier 518, and other data such as a description of the event, identification of the event organizer, etc. The potential participants may be reachable electronically via an electronic mail message, calendar invitation, social network, or other device or virtual connection.

In some embodiments (not shown), rather than sending the event invitation 512 directly to the identified potential participants at 606, the mobile computing device 502 notifies the content sharing service 102 of the identified potential participants. The content sharing service 102 then operates to notify the identified potential participants of the event.

After sending the event invitations 512 to the identified potential participants at 606, the mobile computing device 502 may continue to search for additional potential participants (e.g., as in 602), as well as proceed to perform the operations described next with reference to FIG. 6B.

In FIG. 6B, an exemplary flow chart illustrates operation of the mobile computing device 502 to associate participants with the event. If, at 608, the mobile computing device 502 receives an acceptance or other response from the potential participants to whom the mobile computing device 502 sent the event invitations 512 at 606, the mobile computing device 502 links, joins, connects, or otherwise associates the requesting participants with the event at 610. The request to join the event includes the global identifier 516 of the event as well as the private identifier 518 of the requesting potential participant. The global identifier 516 is used to identify which event the requesting potential participant is trying to join.

After associating the event participants with the event at 610, the mobile computing device 502 continues to monitor responses from the potential participants (e.g., as in 608), continues to search for additional potential participants (e.g., as in FIG. 6A), and proceeds to perform the operations described next with reference to FIG. 6C.

In FIG. 6C, an exemplary flow chart illustrates operation of the mobile computing device 502 to receive content created by event participants and selectively share the received content with other participants. If the mobile computing device 502 receives content from one or more of the event participants at 612, the mobile computing device 502 shares the received content with each of the other event participants or selectively shares the received content with other event participants at 614 based at least in part on the private identifiers 518. The received content includes the global identifier 516 and the private identifier 518 of the event participant submitting the content. The mobile computing device 502 associates the received content with the event corresponding to the global identifier 516.

If the received content is designated for all participants, then content is shared by the mobile computing device 502 with all participants rather than to a selected group. Alternatively or additionally, the mobile computing device 502 may request content from one or more participants with a content request. Content is then received by the mobile computing device 502, which then shares the received content with the participants as just described.

Selectively sharing the content is performed by the mobile computing device 502 based on the private identifier 518, similar to how the content sharing service 102 selectively shares the content (e.g., see FIG. 3C). The mobile computing device 502 may share the content via a peer-to-peer network, or may submit the received content to the content sharing service 102 (e.g., for dissemination via the public storage area 108 or the private storage area 110 based on the private identifiers 518). As described above, there may be a single storage area (e.g., event storage area 106) that designates general or private access by including a designation in a file header, metadata, or by other means. Alternatively or in addition, the storage area may include a plurality of separate storage areas. For example, one of the storage areas may store content intended for public sharing, and one of the storage areas may store content intended for selective sharing with event participants based on the private identifiers 518.

In some aspects of the disclosure, content received by the mobile computing device 502 may be combined with other received content, with content provided by the event organizer, or with content from another entity. The content may be combined based on private identifiers 518 so that certain participant content is only available for limited distribution to those participants having permission to access that specific content and/or information.

In some embodiments, the user of the mobile computing device 502 may also create and share content associated with the event.

The content may be received by the mobile computing device 502 as soon as the content is created by the event participant who submits the content. In other embodiments, the content may be received at regular intervals, such as a nightly batch. Similarly, the mobile computing device 502 may share the content instantaneously, immediately, or otherwise as soon as the content is received, or may share the content at regular intervals, such as a nightly batch update.

The mobile computing device 502 may also keep track of which participant has accessed which content stored by the mobile computing device 502 and provide notifications when new content is available. Also, the mobile computing device 502 may store content for some time during and after an event for participants that have not accessed available content or otherwise need to access the content again. After some period of time, content may be moved to another accessible location and the mobile computing device 502 provides a pointer, a web address or other information for a participant to access the content.

Additional Examples

The exemplary data structure includes a description of an event and content associated with the event. In the example below, the "Event Guid" field represents the global identifier 516, while the "Email" and "Device Id" fields represent the private identifier 518.

```
<?xml version="1.0" encoding="utf-8"?>
<Root>
    <Event="High school reunion and dinner">
        <Destination="Bellevue"></Destination>
        <Start time=="UTC-7">10:00:00</Start>
        <Stop time="UTC-7">17:10:00</Stop>
        <Event Guid=F9168C5E-CEB2-4faa-B6BF-329BF39FA1E4>
            <Program type="Invitation">
<Email="yyy@yyy.com"><Device Id="Phone Number">
            <Program type="Invitation">
<Email="zzz@yyy.edu"><Device Id="Phone Number">
            <Program type="Invitation">
<Email="aaa@yyy.net"><Device Id="Phone Number">
            <Program type="Invitation">
<Email="bbb@yyy.com"><Device Id="Phone Number">
            <Program type="Invitation"> <Username="BJones">
<Domain="domain.uuu.com"> <Device Id="Phone Number">
        </Event>
        <Event Content Display Platform="Phone">
            <Content type="Photos">
            <Content type="Video">
            <Content type="Audio">
            <Content type="VCards">
            <Content type=All> <To=Event:F9168C5E-CEB2-4faa-B6BF-329BF39FA1E4>
        </Event Content>
```

In an example scenario, the user registers for a technical conference and receives a notification from the event organizer including the global identifier 516 and the private identifier 518 assigned to the user. By accepting the notification, or otherwise indicating a willingness to receive and share content associated with the event, the user subsequently begins to automatically receive pre-conference papers or other content from participants to the technical conference. The user may create content by performing a peer review of the pre-conference papers, and the user-created content (e.g., the peer-reviewed papers) are submitted back to the content sharing service 102 for dissemination to the other event participants. The event participants may continue to automatically share content during and after the event at the discretion of each event participant.

At least a portion of the functionality of the various elements in the figures may be performed by other elements in the figures, or an entity (e.g., processor, web service, server, application program, computing device, etc.) not shown in the figures.

In some embodiments, the operations illustrated in FIG. 3A, FIG. 3B, FIG. 3C, FIG. 6A, FIG. 6B, and FIG. 6C may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users. In such embodiments, notice is provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Computer storage media exclude propagated data signals. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for combining event-related content from a plurality of devices 104 based on the global identifier 516 and the plurality of private identifiers 518 included in the event invitations 512.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
    a memory area associated with a mobile computing device of a user, said memory area storing user data; and
    a processor programmed to:
        communicate with one or more devices to identify potential participants to an event based on the user data stored in the memory area and to identify an event organizer associated with the event;
        send event invitations to the identified potential participants of the event, each of said event invitations including a global identifier and one of a plurality of private identifiers, each of said plurality of private identifiers corresponding to one or more of the identified potential participants;
        receive an acceptance of the sent event invitation from one or more of the identified potential participants to join the event as event participants, said received acceptance including the global identifier;
        associate the event participants with the event based on the global identifier;
        receive notification of content created by at least one of the event participants for association with the event, said received notification including the private identifier corresponding to said at least one of the event participants;
        access event related content from the one or more devices and the content created by the at least one of the event participants;
        combine the event related content with the content created by the at least one of the event participants based on the global identifier and the plurality of private identifiers included in the event invitations, wherein the combination is based on the private identifiers so that the combined content is available for limited distribution to those event participants that have permission to access the combined content; and
        share the combined content with one or more of the event participants.

2. The system of claim 1, wherein the processor is further programmed to create content from the user and share the created content selectively with one or more of the event participants based at least on the private identifiers associated with the event participants.

3. The system of claim 1, wherein the processor is programmed to communicate with the one or more devices to identify the potential participants to the event by: identifying one or more devices proximate to the mobile computing device; and communicating with the identified devices to identify the potential participants to the event.

4. The system of claim 3, wherein the identified one or more devices store data describing users of the identified one or more devices, and wherein the processor is further programmed to compare the user data stored in the memory area with the data describing users of the identified one or more devices.

5. The system of claim 1, wherein the user data describes affiliations or interests of the user.

6. The system of claim 1, wherein the processor is further programmed to identify the event by identifying an event proximate to the mobile computing device.

7. The system of claim 1, wherein the processor is programmed to send the event invitations by notifying a content sharing service of the identified potential participants.

8. The system of claim 1, wherein the processor is further programmed to search the content based at least on keywords.

9. The system of claim 1, wherein the processor is programmed to selectively share the content by transmitting the content to said one or more of the event participants via a peer-to-peer network or transmitting the content to a content sharing service.

10. A method comprising:
    identifying, by a computing device, potential participants to an event and identifying an event organizer associated with the event;
    communicating, by the computing device, with one or more devices to identify potential participants of the event, said communicating including sending a global identifier and one of a plurality of private identifiers, each of said plurality of private identifiers corresponding to one or more of the identified potential participants;
    receiving a request from one or more of the identified potential participants to join the event as event participants, said received request including the global identifier;
    associating the event participants with the event based on the global identifier;
    receiving content from at least one of the event participants for association with the event;
    accessing event related content from the one or more devices;
    combining the event related content with the content received from the at least one of the event participants based on the global identifier and the plurality of private identifiers, wherein the combination is based on the private identifiers so that the combined content is available for limited distribution to those event participants that have permission to access the combined content; and
    sharing, by the computing device, the combined content with one or more of the event participants.

11. The method of claim 10, wherein notifying the identified potential participants comprises notifying the identified potential participants located remotely from a location associated with the event.

12. The method of claim 10, wherein identifying the potential participants to the event comprises identifying the potential participants based on one or more of the following: participant preferences, participant locations, and selection by the event organizer.

13. The method of claim 10, wherein notifying the identified potential participants of the event includes transmitting a token representing the global identifier and one or more of a plurality of private identifiers, each of the plurality of private identifiers being associated with one or more of the identified potential participants.

14. The method of claim 10, wherein sharing the filtered content with one or more of the event participants comprises storing the filtered content in a private storage area shared only by a subgroup of the one or more of the event participants.

15. The method of claim 10, further comprising storing the filtered content in a public storage area or a private storage area depending on a private identifier of said at least one of the event participants.

16. The method of claim 10, further comprising:
defining permissions for each of the event participants, said permissions controlling access by the event participants to the received content; and applying a digital rights management policy to the received content before selectively sharing the received content with the one or more of the event participants, the digital rights management policy including a content license.

17. The method of claim 16, wherein defining the permissions comprises defining the permissions based on sharing preferences received from each of the event participants, said sharing preferences identifying the event participants with which to share content.

18. One or more computer storage media embodying computer-executable components, said components comprising:
a search component that when executed causes at least one processor to communicate with one or more devices to identify potential participants to an event and to identify an event organizer associated with the event;
a token component that when executed causes at least one processor to notify the potential participants identified by the search component of the event by sending a global identifier and one of a plurality of private identifiers to each of the identified potential participants, each of said plurality of private identifiers corresponding to one or more of the identified potential participants;
a pairing component that when executed causes at least one processor to receive a request from one or more of the identified potential participants to join the event as event participants, said received request including the global identifier, said pairing component further associating the event participants with the event based on the global identifier;
a communications interface component that when executed causes at least one processor to receive content from at least one of the event participants for association with the event and to access event related content from the one or more devices; and
a content component that when executed causes at least one processor to combine the event related content with the content received from the at least one of the event participants based on the global identifier and the plurality of private identifiers, wherein the combination is based on the private identifiers so that the combined content is available only for limited distribution to those event participants that have permission to access the combined content.

19. The computer storage media of claim 18, wherein the token component sends a calendar invitation to the potential participants of the event, said calendar invitation including the global identifier and at least one of a plurality of private identifiers, each of the plurality of private identifiers being associated with one or more of the identified potential participants.

20. The computer storage media of claim 18, wherein the communications interface component receives the content during one or more of the following time periods: before occurrence of the event, during occurrence of the event, and after occurrence of the event.

* * * * *